Feb. 27, 1968     O. M. TREANGEN     3,370,570

ELECTRIC ANIMAL TRAINER

Filed June 6, 1966

INVENTOR.
ORVEL M. TREANGEN
BY Williamson, Palmatier
& Bains ATTORNEYS

United States Patent Office 3,370,570
Patented Feb. 27, 1968

3,370,570
ELECTRIC ANIMAL TRAINER
Orvel M. Treangen, Spring Grove, Minn. 55974
Filed June 6, 1966, Ser. No. 555,601
4 Claims. (Cl. 119—27)

This invention relates to an animal trainer and, more particularly, relates to an animal trainer adapted to maintain a cow in a predetermined position in a stall.

Since it is important to a dairy farmer to receve the highest quality rating for his farm, the dairyman must maintain his cows, stalls, stanchions, barn and equipment in the cleanest condition possible. Stanchions are provided in each stall to maintain a cow in a specific relation with respect to a trough or gutter which receives the droppings from the cow. It is important that dropping from the cow are received by the trough and that the cow does not step into the droppings upon evacuation.

In view of the fact that cows are particularly sensitive to the slightest electrical shock, electrically charged animal trainers have been devised for maintaining a cow in a predetermined position in a stanchion when evacuating. Of the cow trainers presently on the market, the readily adjustable trainers are not particularly reliable in conducting current to the cow. It is particularly important that the setting of the animal trainer relative to the cow be adjustable within a fraction of a inch in order to achieve optimum operating characteristics.

Other cow trainers which reliably conduct the current to the cow, do not provide for the minute adjustment necessary. Further, it is important, in obtaining the adjustment of the cow trainer relative to the cow, that a minimum of room over the current conducting wire be utilized in that oftentimes stalls have a minimum of head room available.

With these comments in mind it is to the elimination of these and other disadvantages to which the present invention is directed, along with the inclusion therein of other novel and desirable features.

An object of my invention is to provide a new and improved cow trainer of simple and inexpensive construction and operation.

Another object of my invention is the provision of a novel cow trainer which reliably conducts current from a current carrying wire to the animal contacting member.

Still another object of my invention is the provision of an improved and novel cow trainer which is quickly and easily adjusted to suit an individual cow and utilizes a minimum of head room above the current conducting wire.

These and other objects and advantages of my invention will more fully appear from the following description made in connection with the accompanying drawing wherein like reference characters refer to the same or similar parts throughout the several views, and in which.

Figure 1:
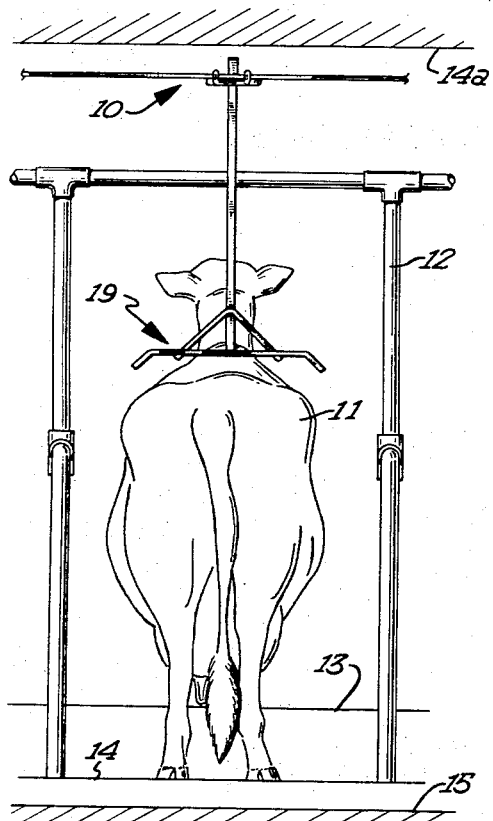
FIG. 1 is a diagrammatic sketch showing a typical usage of my animal trainer as viewed from the rear.

One form of the present invention is shown in the drawings and is described herein.

Referring to FIG. 1, my animal trainer is indicated in general by numeral 10 as it would appear in relation to a cow 11 in a stall with a stanchion 12 mounted therein. A feed shelf is indicated at 13. The floor of the stall is indicated at 14 and the ceiling at 14a. A refuse trough 15 is disposed in the floor for the purpose of receiving the droppings from the cow 11.

Figure 2:
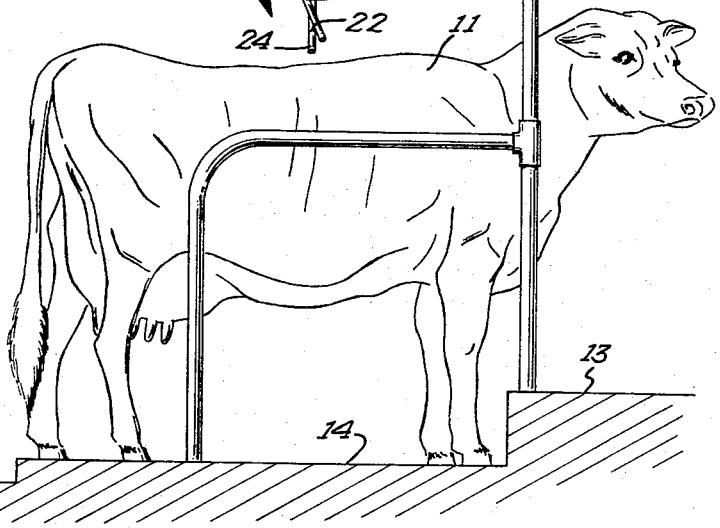
FIG. 2 is a diagrammatic sketch showing a typical usage of my animal trainer as viewed from the side.

As seen in FIG. 2, the trough 15 is positioned rearwardly of the cow 11 such that when cow 11 is in the proper position the droppings will fall into trough 15. Since cows arch their backs and move their rear legs forwardly when they are about to evacuate, a cow trainer can be so positioned such that it will contact the cow only when it is positioned improperly with respect to the trough 15. In other words, when the cow is properly positioned and arches its back, it does not contact the trainer 10. However, if the cow is not properly positioned relative to trough 15, it contacts trainer 10, is shocked, and quickly assumes another position in which its does not receive a shock.

Figure 3:
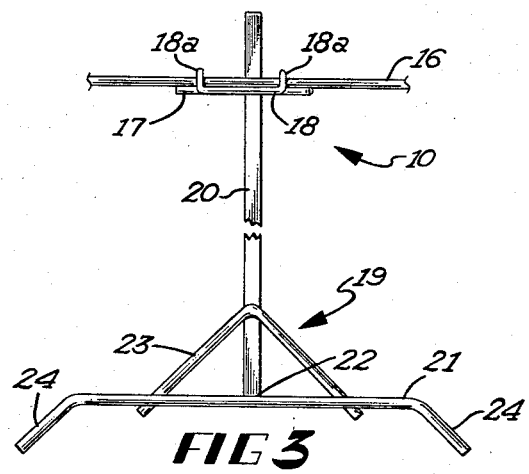
FIG. 3 is an enlarged detailed rear elevation view of my animal trainer.

Referring to FIG. 3, my animal trainer 10 is shown in detail. An electric current conducting wire 16 is connected to a suitable power source which is not shown here. Clip member 17 is shown and includes a wire contacting element 18 with depending hooks 18a affixed thereto and adapted to engage wire 16 and be slidably, but firmly, mounted thereon. Wire contacting element 18 allows assembly of clip 17 to wire 16 without disturbing the wire and allows hooks 18a to pivot about wire 16. Further, wire engaging element 18 conducts electricity from wire 16 to clip member 17. Also shown in FIG. 3 is the transverse animal contacting member, indicated in general by numeral 19, contacting member 19 comprises an upright rod 20 adapted to be secured in clip member 17, and transverse animal contacting element 21 joined, as by welding or soldering, to upright 20 at the junction indicated by numeral 22. A supplemental brace 23 may be utilized as necessary and is joined to animal contacting element 21 and upright 20 by soldering or welding. Upright 20, contact element 21 and brace 23 are typically constructed of a rigid aluminum rod having a rectangular cross section. Current is conducted from wire 16 through the clip member 17 and into upright 20. Contact element 21 is joined to upright 20 which conducts electricity to the animal contacting element. Contact element 21 may include a pair of depending portions 24 to prevent movement of the cow sideways.

Figure 4:
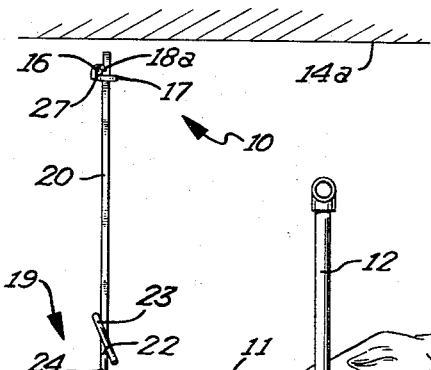
FIG. 4 is an enlarged partial perspective view of the clip member and upright rod of my animal trainer.
Figure 4:
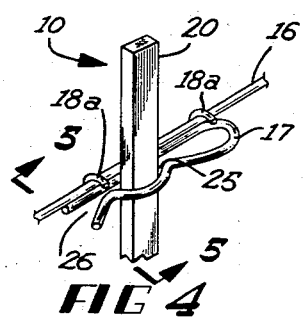

Referring to FIG. 4, upright rod 20 is shown inserted in clip member 17 through rod receiving aperture 25 in clip member 17. Wire engaging element 18 is shown engaging wire 16 at hooks 18a. It should be noted that rod 20 may be inserted through aperture 18, or it may be inserted through the opening, indicated at 26, and forced sideways into opening 25 since the clip member 17 is constructed of yieldable, tempered steel, which permits flexing and which firmly grips rod 20 in a predetermined upright position relative to the animal. Further, I have found that this method of connecting upright 20 to clip member 17 not only provides adequate reliable electrical connection between each element, but also provides a quick means for adjusting the elevation of animal contact element 21 relative to the cow. The portion of rod 20 which extends above clip 17 may be readily removed from rod 20 since it is not necessary to the proper functioning of the rod. Therefore, a minimum of space is required above clips 17 to ceiling 14a for proper adjustment of the animal contacting element. Since hooks 18a pivot at wire 16, the downward gravity force of animal contact member 19 on clip 17 causes a torque about wire 16 at hooks 18a. Therefore clip 17 rotates slightly and rod receiving aperture 25 "bites" rod 20 therein further securing the animal contact member in clip 17.

Figure 5:
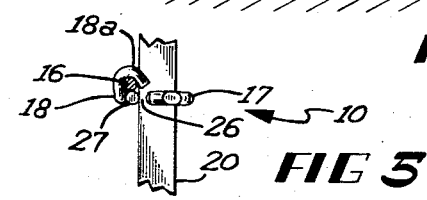
FIG. 5 is a sectional view taken along section lines 5—5 of FIG. 4.

Referring to FIG. 5, the wire engaging element 18 is shown in position engaging wire 16. As indicated, wire engaging element 18 is welded to clip 17 at weld 27.

In operation, the clip member is readily attached to a wire 16 which is located transversely of the cow, attached to a suitable power source and which receives tempered wire engaging element 18 thereon without the necessity of threading wire 16 therethrough. Electrical contact is maintained through the frictional engagement of wire contacting element 18 and, since element 18 is welded to clip 17, current is carried thereto. Upright member 20 may be inserted through the properly transversely positioned aperture 25 in clip 17 and raised to the proper elevation over the cow 11. If the head room requirements are such that rod 20 is too long, it may simply be cut off above the clip member 17 without interfering with the proper functioning of my cow trainer. The frictional contact between member 17 and upright 20 is sufficient to conduct the electricity through clip 17 and into rod 20 and hence to the animal contact element 21. Further, the downward force of the cow contacting member 19 pulling on clip 17 tends to place a torque on clip 17, rotating the clip downwardly on wire 16. This more tightly secures upright 20 in clip member 17 thereby preventing change in the critical adjustment of the cow contacting member 19 relative to the cow 11.

From the foregoing it will be seen that I have provided a new and novel animal trainer which not only reliably carries the electrical circuit from the current conducting wire but which is also easy to adjust to accommodate a specific animal. Since each animal varies in height and in its arched position when evacuating, it is particularly important that each cow trainer be vertically adjusted to contact a cow when it is in a position other than that in which droppings will fall into a trough. Further, my cow trainer requires a minimum of head room for proper operation and is not functionally affected when the upright rod is cut above the clip.

It will, of course, be understood that various changes may be made in the form, details, arrangement and proportions of the various parts without departing from the scope of my invention.

What is claimed is:

1. An animal trainer adapted for use in an animal stall having a refuse trough therein, said animal trainer comprising,
    an electric current conducting wire adapted to be attached to a suitable source of electric current and disposed over the animal and in a predetermined transverse position relative to the animal housed in the stall,
    an elongated horizontally disposed clip member slidably affixed to said current conducting wire in current conducting relation thereto, said clip member having a resilient and gripping rod receiving aperture therein,
    an animal contacting member having an upright rigid rod slidably engaged in the rod receiving aperture of said clip member and in current conducting relation therewith, and an animal contacting element attached to the upright rod generally transversely thereto and in current conducting relation therewith, the animal contacting element disposed in a predetermined position relative to the animal housed within the stall whereby current is conducted to the animal when the animal assumes a predetermined position.

2. The animal trainer of claim 1 wherein said clip member includes,
    a wire engaging element affixed thereto and in current conducting relation therewith, said wire engaging element having hook means adapted to engage said current conducting wire in current conducting relation, whereby said clip member may rotate on said wire about the hook means of said wire engaging element thereby increasing the frictional grip of said clip member on the upright portion of said animal contacting member.

3. The animal trainer of claim 1 wherein,
    said clip member is biased in a closed position maintaining the rod receiving aperture in tight fitting relation with the upright rod and said clip member having an opening adapted to receive the upright rod for transverse movement into the rod receiving aperture.

4. The animal trainer of claim 1 wherein the animal contact element includes terminal depending portions adapted to maintain the animal properly aligned in the stall.

References Cited

UNITED STATES PATENTS

| | | | |
|---|---|---|---|
| 2,428,875 | 10/1947 | Hantz | 119—27 |
| 2,790,416 | 4/1957 | Klinzing | 119—27 |
| 2,830,556 | 4/1958 | Grams | 119—27 |
| 3,038,444 | 6/1962 | Roth | 119—27 |
| 3,043,266 | 7/1962 | Olscheske | 119—27 |

ALDRICH F. MEDBERY, *Primary Examiner.*